(12) United States Patent
Verrilli et al.

(10) Patent No.: US 12,165,237 B2
(45) Date of Patent: Dec. 10, 2024

(54) MEMORY STORAGE FORMAT FOR SUPPORTING MACHINE LEARNING ACCELERATION

(71) Applicant: QUALCOMM Incorporated, San Diego, CA (US)

(72) Inventors: Colin Beaton Verrilli, Apex, NC (US); Natarajan Vaidhyanathan, Carrboro, NC (US); Matthew Simpson, Durham, NC (US); Geoffrey Carlton Berry, Durham, NC (US); Sandeep Pande, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 17/946,753

(22) Filed: Sep. 16, 2022

(65) Prior Publication Data

US 2024/0095872 A1 Mar. 21, 2024

(51) Int. Cl.
*G06T 1/60* (2006.01)
*G06N 3/063* (2023.01)

(52) U.S. Cl.
CPC .............. *G06T 1/60* (2013.01); *G06N 3/063* (2013.01); *G06T 2207/20084* (2013.01)

(58) Field of Classification Search
CPC .......................... G06T 1/20; G06T 1/60; G06T 2207/20084; G06F 12/00; G06N 3/0464; G06N 3/0495; G06N 3/063
USPC ...................................................... 345/531
See application file for complete search history.

(56) References Cited

U.S. PATENT DOCUMENTS

| | | | |
|---|---|---|---|
| 2019/0236755 A1* | 8/2019 | Killebrew | G06T 3/4046 |
| 2020/0104690 A1* | 4/2020 | Bai | G06F 9/30098 |
| 2020/0183833 A1 | 6/2020 | Sakharshete et al. | |
| 2022/0245447 A1* | 8/2022 | Liu | G06N 3/08 |

FOREIGN PATENT DOCUMENTS

WO 2022142986 A1 7/2022

OTHER PUBLICATIONS

International Search Report and Written Opinion—PCT/US2023/030397—ISA/EPO—Dec. 11, 2023.

* cited by examiner

*Primary Examiner* — Jacinta M Crawford
(74) *Attorney, Agent, or Firm* — QUALCOMM Incorporated

(57) ABSTRACT

A processor-implemented method for a memory storage format to accelerate machine learning (ML) on a computing device is described. The method includes receiving an image in a first layer storage format of a neural network. The method also includes assigning addresses to image pixels of each of three channels of the first layer storage format for accessing the image pixels in a blocked ML storage acceleration format. The method further includes storing the image pixels in the blocked ML storage acceleration format according to the assigned addresses of the image pixels. The method also includes accelerating inference video processing of the image according to the assigned addresses for the image pixels corresponding to the blocked ML storage acceleration format.

23 Claims, 14 Drawing Sheets

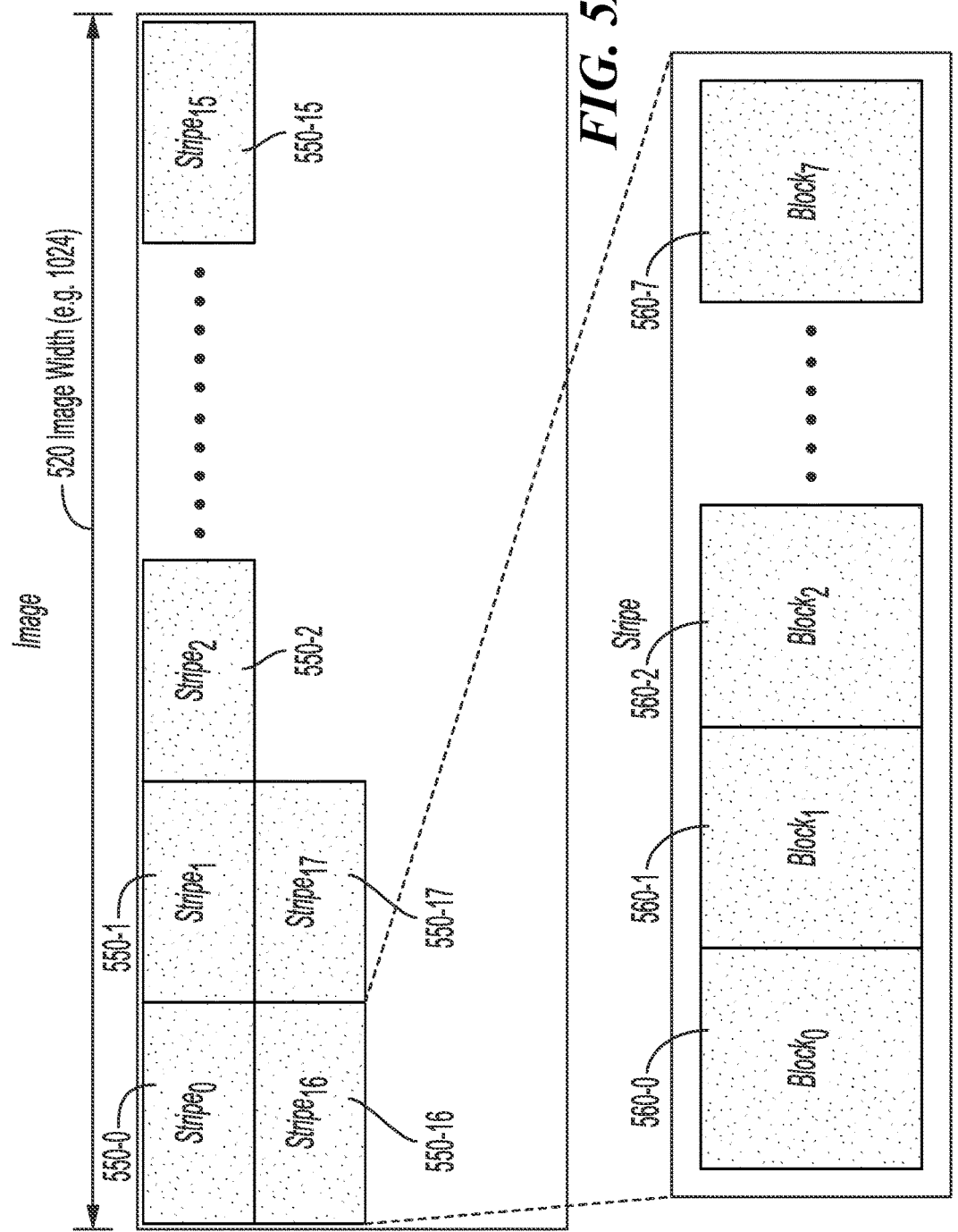

| | | 8-bit | 16-bit |
|---|---|---|---|
| Stride = 1 | Spatial Major | $(y_n...y_3) * D + x_m...x_6 x_2 y_1 x_2 x_1 x_5 y_2 x_1 y_0 x_0$<br>$D = \lceil W/64 \rceil * 2^{11}$ | $(y_n...y_3) * D + x_m...x_5 y_2 x_1 y_0 x_1 x_4 x_3 x_2 c_1 c_0 x_0 b$<br>$D = \lceil W/32 \rceil * 2^{11}$ |
| | Channel Major | $(y_n...y_3) * D + x_m...x_6 x_2 y_1 y_0 x_2 x_1 x_0 x_5 x_4 x_3 c_1 c_0$<br>$D = \lceil W/64 \rceil * 2^{11}$ | Not Applicable |
| Stride = 2 | Spatial Major | $(y_n...y_4) * D + x_m...x_7 x_0 y_3 y_2 x_3 x_2 x_6 x_5 x_4 c_1 c_0 y_1 x_1$<br>$D = 4 * \lceil W/128 \rceil * 2^{11}$ | $(y_n...y_4) * D + x_m...x_6 x_0 y_3 y_2 y_1 x_2 x_5 x_4 x_3 c_1 c_0 x_1 b$<br>$D = 4 * \lceil W/64 \rceil * 2^{11}$ |
| | Channel Major | $(y_n...y_4) * D + x_m...x_7 x_0 y_3 y_2 y_1 x_3 x_2 x_1 x_6 x_5 x_4 c_1 c_0$<br>$D = 4 * \lceil W/128 \rceil * 2^{11}$ | Not Applicable |

800

Where,
- $x = x_m x_{m-1}...x_3 x_2 x_1 x_0, m >= 2m = \lfloor \lg_2 W \rfloor$
- $y = y_n y_{n-1}...y_3 y_2 y_1 y_0, n >= 2n = \lfloor \lg_2 H \rfloor$
- $c = c_1 c_0$
- $b = 1/0$ (byte order for 16-bit)
- $W = ImageWidth$
- $H = ImageHeight$

- $w_r$ = width rounding granularity
  - $w_r$ = 64 for packed D4, stride = 1, int8
  - $w_r$ = 128 for packed D4, stride = 2, int8
  - $w_r$ = 32 for packed D4, stride = 1, int16
  - $w_r$ = 64 for packed D4, stride = 2, int16
- $h_r$ = height rounding granularity
  - $h_r$ = 8 for stride = 1
  - $h_r$ = 16 for stride = 2
- $W_r$ = RoundUp($W$, $W_r$)
- $H_r$ = RoundUp($H$, $H_r$)

*FIG. 8*

MEMORY STORAGE FORMAT FOR SUPPORTING MACHINE LEARNING ACCELERATION

TECHNICAL FIELD

Certain aspects of the present disclosure generally relate to artificial neural networks and, more particularly, to a memory storage format for supporting machine learning (ML) acceleration.

BACKGROUND

An artificial neural network, which may include an interconnected group of artificial neurons, may be a computational device or may represent a method to be performed by a computational device. Artificial neural networks may have corresponding structure and/or function in biological neural networks. Artificial neural networks, however, may provide useful computational techniques for certain applications, in which traditional computational techniques may be cumbersome, impractical, or inadequate. Because artificial neural networks may infer a function from observations, such networks may be useful in applications where the complexity of the task and/or data makes the design of the function burdensome using conventional techniques.

In computing, hardware acceleration is the use of computer hardware to perform some functions more efficiently than is possible in software running on a more general purpose central processing unit (CPU). The hardware that performs the acceleration may be referred to as a hardware accelerator. Machine learning accelerators may improve the performance of artificial neural networks. In practice, the first layer of many computer vision machine learning (ML) networks is potentially limited to three channels (e.g., red, green, and blue (RGB)). Unfortunately, preparation for processing the first layer of these computer vision ML networks results in a large allocation of tightly coupled memory (TCM) due to limited channel depth of this first layer due to inefficient allocation of memory. A memory storage format for supporting machine learning (ML) acceleration in computer vision networks is desired.

SUMMARY

A processor-implemented method for a memory storage format to accelerate machine learning (ML) on a computing device is described. The method includes receiving an image in a first layer storage format of a neural network. The method also includes assigning addresses to image pixels of each of three channels of the first layer storage format for accessing the image pixels in a blocked ML storage acceleration format. The method further includes storing the image pixels in the blocked ML storage acceleration format according to the assigned addresses of the image pixels. The method also includes accelerating inference video processing of the image according to the assigned addresses for the image pixels corresponding to the blocked ML storage acceleration format.

A non-transitory computer-readable medium having program code recorded thereon for a memory storage format to accelerate machine learning (ML) on a computing device is described. The program code is executed by a processor of the computing device. The non-transitory computer-readable medium includes program code to receive an image in a first layer storage format of a neural network. The non-transitory computer-readable medium also includes program code to assign addresses to image pixels of each of three channels of the first layer storage format for accessing the image pixels in a blocked ML storage acceleration format. The non-transitory computer-readable medium further includes program code to store the image pixels in the blocked ML storage acceleration format according to the assigned addresses of the image pixels. The non-transitory computer-readable medium also includes program code to accelerate inference video processing of the image according to the assigned addresses for the image pixels corresponding to the blocked ML storage acceleration format.

A system for a machine learning (ML) acceleration architecture is described. The system includes a neural signal processor (NSP) to assign addresses to image pixels of each of three channels of a first layer storage format of a neural network for accessing an image in a blocked ML storage acceleration format. The NSP is further to store the image pixels in the blocked ML storage acceleration format according to the assigned addresses. The system also includes a ML accelerator to accelerate inference video processing of an image according to the assigned addresses for the image pixels of the image corresponding to the blocked ML storage acceleration format.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 5A and 5B are block diagrams illustrating a partition of an image into a machine learning (ML) storage acceleration format, according to aspects of the present disclosure.

FIG. 8 is a illustrates table including equations for data packing formats to support machine learning (ML) storage acceleration formats, in accordance with aspects of the present disclosure.

DETAILED DESCRIPTION

Figure 1:
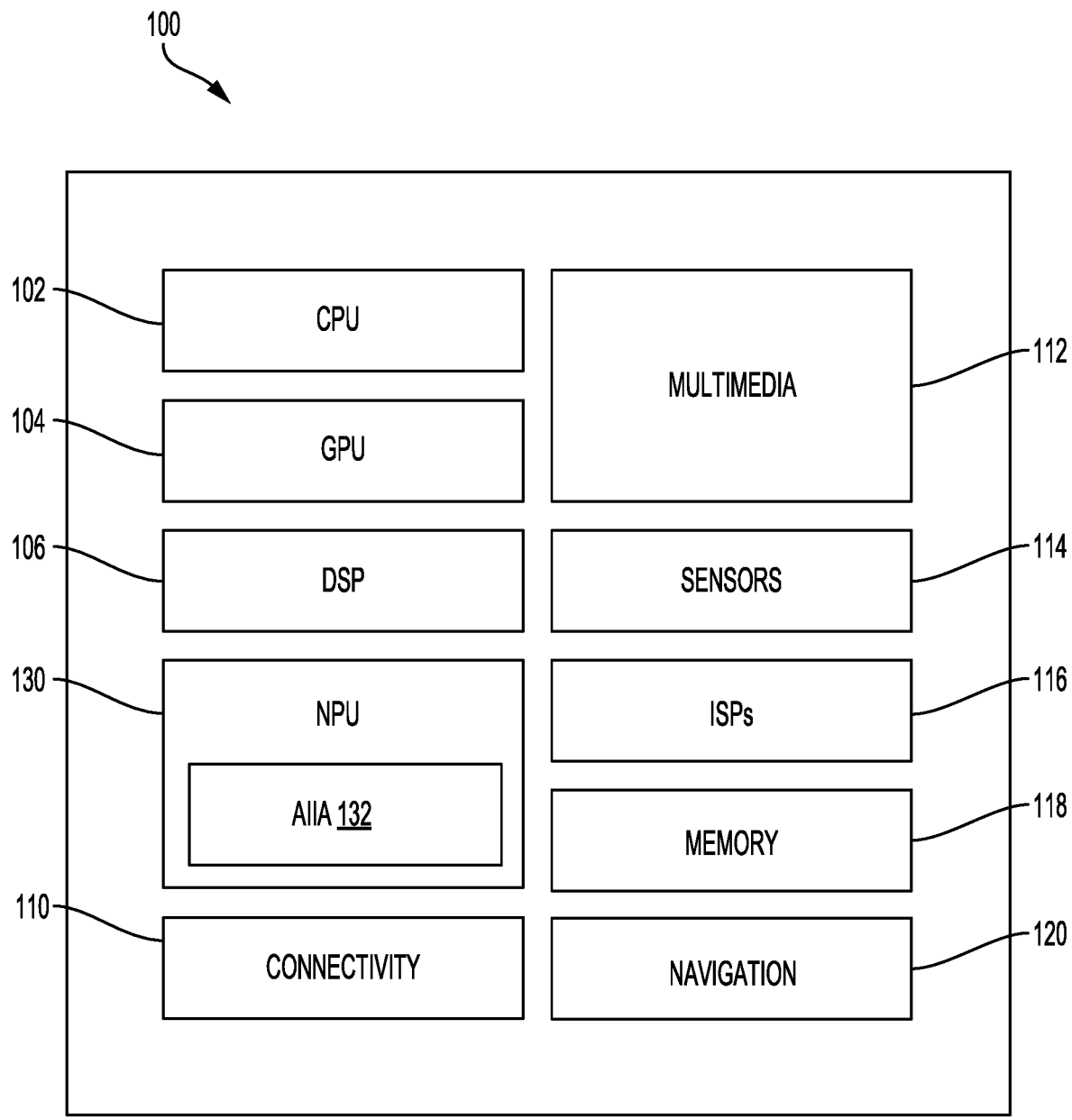
FIG. 1 illustrates an example implementation of designing a neural network using a system-on-chip (SoC), including a general purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. Nevertheless, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

Although particular aspects are described, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different technologies, system configurations, networks, and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

In computing, hardware acceleration is the use of computer hardware to perform some functions more efficiently than is possible in software running on a more general purpose central processing unit (CPU). The hardware that performs the acceleration may be referred to as a hardware accelerator. Machine learning accelerators may improve the performance of artificial neural networks.

generally, a hardware (HW) accelerator is designed for a particular corresponding configuration of input and, consequently, inputs configured differently are unlikely to benefit from the accelerator; some CNN accelerators are designed for input blocks having tens of channels since the input blocks (or "croutons" as the IDF calls them) to many layers comprise many channels; however, the first layer of a CNN often has an input having only a few (e.g., 3 or 4) channels and, as a result, the input blocks to the HW accelerator, based on that first layer input, are padded with zeros, which significantly reduces the efficiency of processing the first layer with the HW accelerator.

In practice, a first layer of many computer vision machine learning (ML) networks has an input that is composed of three channels (e.g., red, green, and blue (RGB)). For example, a tensor may represent the first layer of a computer vision ML network according to a standard NCHW (e.g., batch_size (N), channel (C), height (H), weight (W)) format or an NHWC (e.g., batch_size (N), height (H), weight (W), channel (C)) format, which is fully packed and does not waste any space. By contrast, layers of a computer vision ML network beyond the first layer usually have a greater number of channels (e.g., 32 or more channels).

ML hardware accelerators expect a different data format. In particular, input tensors encountered in computer vision networks have 3 channels in the first layer and significant amounts of channels (e.g., 32 or more) in the subsequent layers. Typically, these ML accelerators are architected for processing tensors having multiples-of-32 channels. Nevertheless, when tensors with fewer than 32 channels (e.g., the first layer with 3 channels), the 3-channel tensor may be padded with random data to convert to an expected 32-channel tensor. Because there are typically many layers other than the first layer in vision networks, it is a reasonable trade off to pad the 3-channel tensor with random data for converting to the expected 32-channel tensor.

Unfortunately, storage of this type of padded tensor, occupies many times the space (e.g., 32 is roughly 10 times 3). As a result, preparation for first layer processing results in a large allocation of tightly coupled memory (TCM) space due to wasted channel depth associated with the first layer of computer vision neural networks. This larger allocation of TCM space may result in a ten-fold expansion of the TCM space. Furthermore, high definition (HD) images provided by computer vision neural networks can be large (e.g., full HD 1920×1080 pixels), which may cause spillage to remote/off-chip/external memory. In particular, if this space expansion is statically allocated and if it is the largest user of the TCM space, then network weights may be forced to dynamic random access memory (DRAM). In addition, for video processing, several streams and multiple frames from each stream may be in flight at any one time. Consequently, DRAM memory allocation can become an issue if the ten-fold expansion is performed for each frame of the HD images. Furthermore, if the first layer preparation is performed on the host, then interconnect traffic (e.g., peripheral component interconnect express (PCIe) traffic) may increase ten-fold.

A machine learning (ML) storage acceleration format that reduces wasted allocation of the TCM space and DRAM, as well as wasted bandwidth for moving padding and wasted PCIe bandwidth is desired. In particular, a memory storage format for supporting ML acceleration in computer vision networks is desired. A packed dense depth data dump (D4) format is a proposed solution.

Some aspects of the present disclosure are directed to an ML storage acceleration format, which may be referred to as the packed D4 format. This packed D4 format allows for less wasted space for processing first layers of computer vision neural networks. This packed D4 format can be processed directly by ML hardware accelerators without having to convert to standard layout by receiving an 8*64*4 input block and re-arranging it into an 8*8*32 input block. In some aspects of the present disclosure, the ML storage acceleration format supports up to four input channels by packing, for example, eight spatial patches (e.g., 8×8*32 input block) into one storage block. In these aspects of the present disclosure, video pre-processing units that prepare raw images for processing by ML vision-based networks provide outputs directly in the ML storage acceleration format.

In some aspects of the present disclosure, the ML storage acceleration format is compatible with cases in which an initial layer is a stride-2 convolution using a decimate-by-four approach. In addition, the ML storage acceleration format is also compatible with cases in which the initial layer is using precision of either 16-bit floating point (FP16) or quantized eight-bit integer (INT8). The ML storage acceleration format also supports both spatial and channel major formats of matrix units. Furthermore, the ML storage acceleration format may take advantage of matrix instructions that allow for sub-block (e.g., four input channel) granularity.

FIG. 1 illustrates an example implementation of a system-on-chip (SoC) 100, which may include a central processing unit (CPU) 102 or multi-core CPUs, in accordance with certain aspects of the present disclosure, such an artificial intelligence (AI) accelerator. Variables (e.g., neural signals and synaptic weights), system parameters associated with a computational device (e.g., neural network with weights), delays, frequency bin information, and task information may be stored in a memory block associated with a neural processing unit (NPU) 130, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

One aspect of the present disclosure is directed to an ML storage acceleration format for machine learning accelerators (MLAs) 132 (e.g., an artificial intelligence inference accelerator (AIIA)) of the NPU 130, which may be referred to as a packed dense depth data dump (D4) format. This packed D4 format allows for less wasted space for processing first layers of computer vision neural networks. This packed D4 format can be processed directly by the MLA 132 without having to convert to standard layout. In some aspects of the present disclosure, the ML storage acceleration format of the MLA 132 supports up to four input channels by packing, for example, eight spatial patches (e.g., 8×8) into one memory storage block.

The SoC 100 may also include additional processing blocks tailored to specific functions, such as a connectivity block 110, which may include fifth generation (5G) new radio (NR) connectivity, fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SoC 100 may also include a sensor processor 114 to provide sensor image data, image signal processors (ISPs) 116, and/or navigation module 120, which may include a global positioning system.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
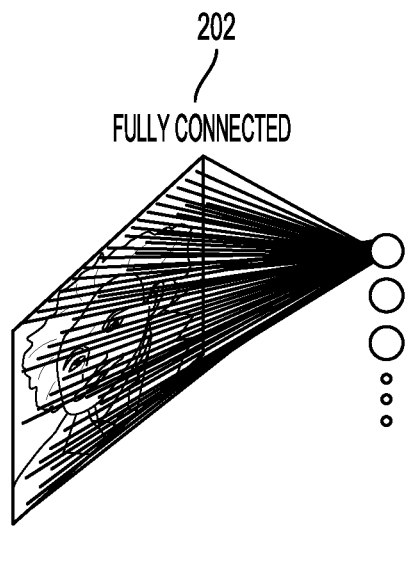
FIGS. 2A, 2B, and 2C are diagrams illustrating a neural network, in accordance with aspects of the present disclosure.
Figure 2B:
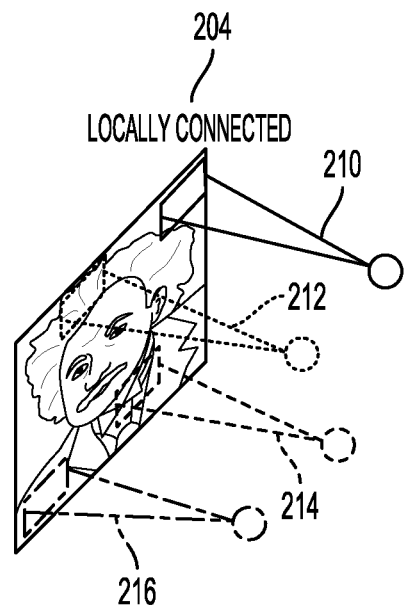

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connection strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
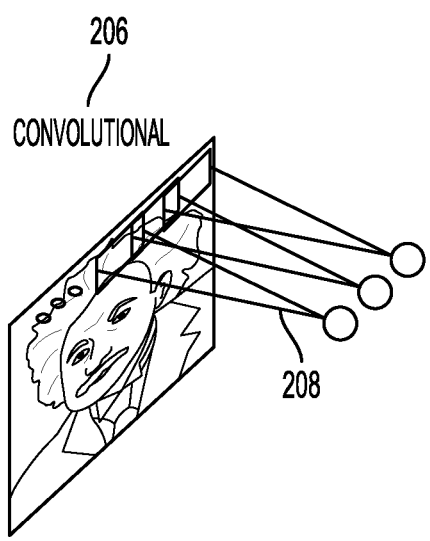

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
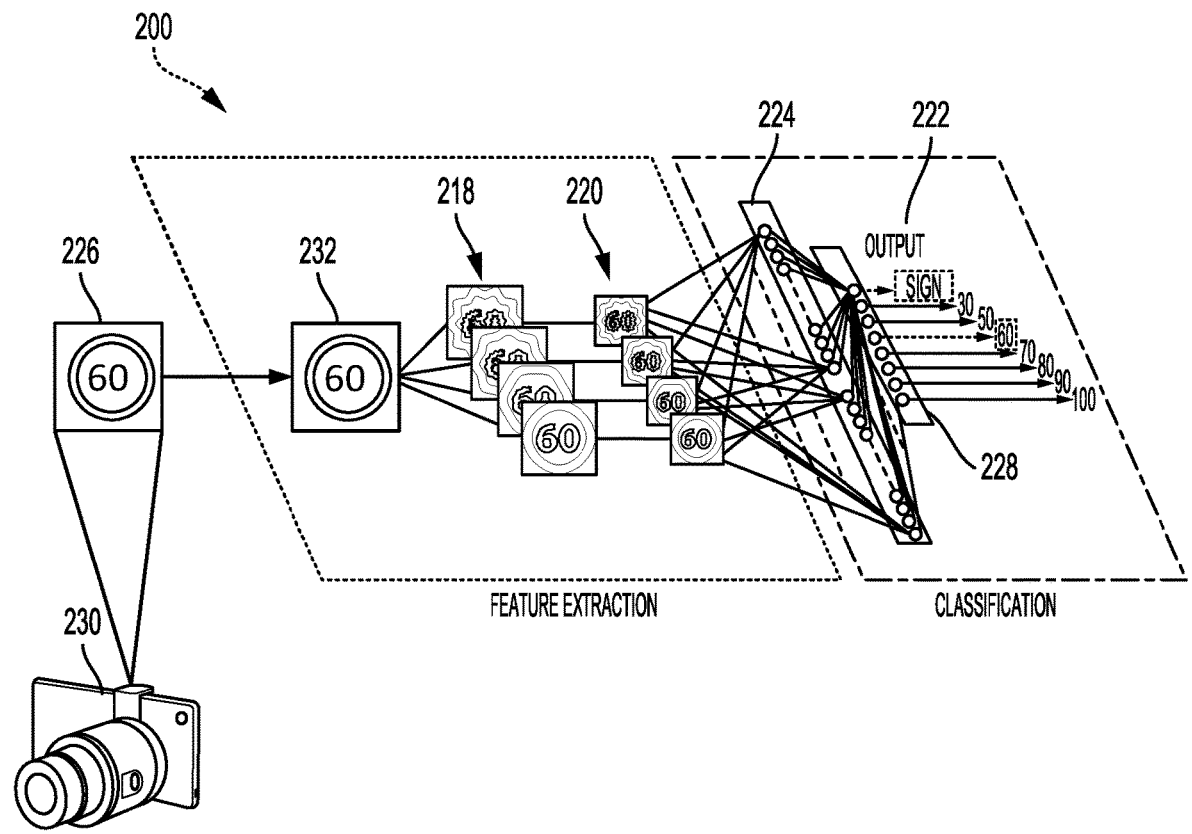
FIG. 2D is a diagram illustrating a neural network, in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different convolutional kernels were applied to the image 226 at the convolutional layer 232, four different feature maps are generated in the first set of feature maps 218. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100." Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

Figure 3:
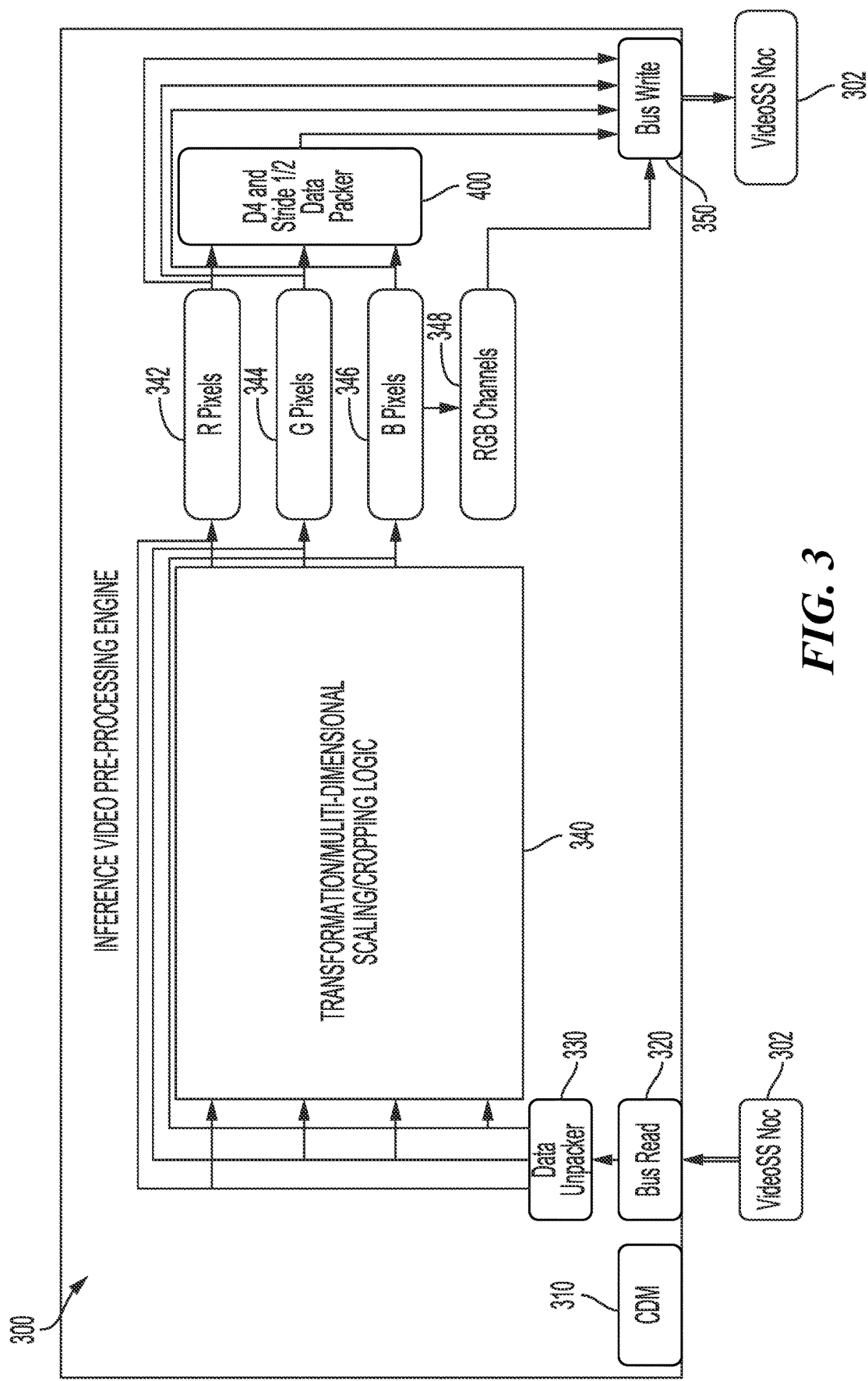
FIG. 3 is a block diagram illustrating an inference video pre-processing engine, configured to output data in a machine learning (ML) storage acceleration format, in accordance with aspects of the present disclosure.

FIG. 3 is a block diagram illustrating an inference video pre-processing engine, configured to output data in a machine learning (ML) storage acceleration format, in accordance with aspects of the present disclosure. An inference video pre-processing (VPP) engine 300 includes a data unpacker 330 to unpack video data from a bus read block 320 in response to a command 310. The bus read block 320 may read the video data from a video subsystem (VideoSS) network-on-chip (NoC) 302. In this configuration, the video data is provided to a transformation/multi-dimensional scaling/cropping logic 340. The transformation/multi-dimensional scaling/cropping logic 340 may perform pre-processing/post-processing on a decoded image or video stream. The transformation/multi-dimensional scaling/cropping logic 340 outputs red (R) pixels 342, green (G) pixels 344, blue (B) pixels 346, and RGB channels 348.

The inference VPP engine 300 may process the first layer of a computer vision ML network. In practice, the first layer of many computer vision ML networks is limited to three channels (e.g., red, green, and blue (RGB)). In practice, a tensor may represent the first layer of the computer vision ML network according to a standard NCHW (e.g., batch_size (N), channel (C), height (H), weight (W)) format or an NHWC (e.g., batch_size (N), height (H), weight (W), channel (C)) format, which is fully packed and does not waste any space. By contrast, layers of a computer vision ML network beyond the first layer usually have a greater number of channels (e.g., 32 or more channels). Unfortunately, ML hardware accelerators expect a different data format. In these aspects of the present disclosure, the R pixels 342, G pixels 344, and B pixels 346 are processed by an ML storage acceleration format block 400, which outputs the pixel data in an ML storage acceleration format to a bus write block 350 to write the formatted data to the VideoSS NoC 302.

Figure 4:
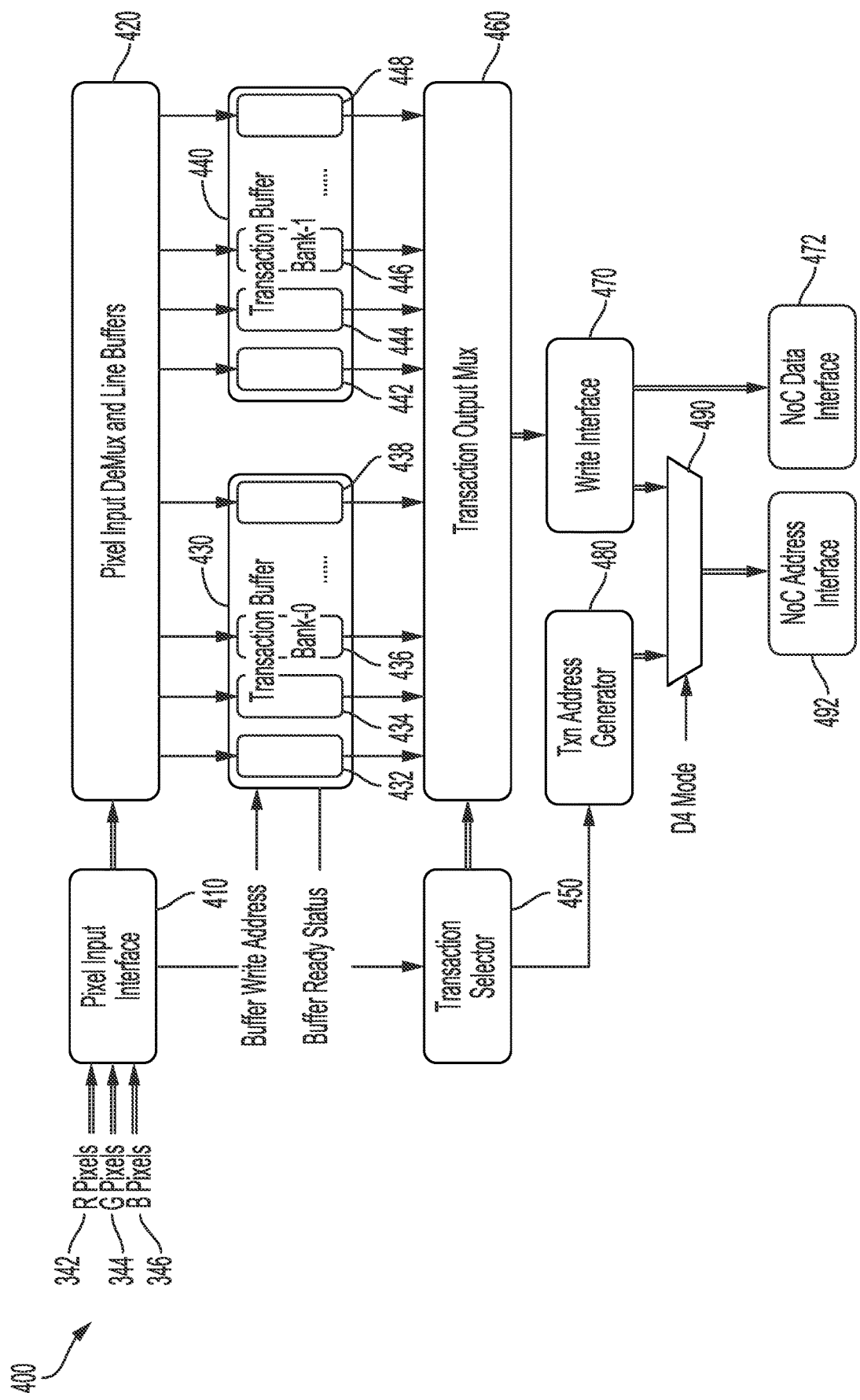
FIG. 4 is a block diagram further illustrating the machine learning (ML) storage acceleration format block of FIG. 3, in accordance with aspects of the present disclosure.

FIG. 4 is a block diagram further illustrating the machine learning (ML) storage acceleration format block 400 of FIG. 3, in accordance with aspects of the present disclosure. As shown in FIG. 4, the ML storage acceleration format block 400 includes a pixel input interface 410 to receive, for example, the R pixels 342, the G pixels 344, and the B pixels 346 from the transformation/multi-dimensional scaling/cropping logic 340 of FIG. 3. In operation, each RGB channel from the R pixels 342, the G pixels 344, and the B pixels 346 sends four pixels-per-clock (PPC). The ML storage acceleration format block 400 also includes a pixel input de-multiplexer (DeMux) and line buffers 420 coupled to the pixel input interface 410. In this configuration, the pixel input DeMux and line buffers 420 de-multiplex two-by-two (2×2) RGB pixels, which are sorted and stored in transaction buffers 432, 434, 436, and 438 of a first transaction buffer bank 430 simultaneously. In a stride-2 mode, the first two lines are stored in the line buffers 420. During the next two lines, the incoming pixels and pixels from the line buffers 420 are transferred to transaction buffers, such as transaction buffers 442, 444, 446, and 448 of a second transaction buffer bank 440.

In some aspects of the present disclosure, each of the transaction buffers (e.g., 432, 434, 436, 438, 442, 444, 446, and 448) are eight bits wide and can hold a full two hundred fifty-six (256) byte transaction. During operation, a transaction selector 450 selects a transaction for writing from the transaction buffers (e.g., 432, 434, 436, 438, 442, 444, 446, and 448). For example, the transaction selector 450 selects the transaction based on the availability of transaction data in one of the transaction buffers (e.g., buffer full), when a transaction is selected for writing. In response to the transaction selector 450, a transaction output multiplexor (Mux) 460 forwards transaction data from the selected transaction buffer (e.g., 432, 434, 436, 438, 442, 444, 446, and 448) to a write interface 470. In addition, a transaction (Txn) address generator 480 generates the address for the write transaction, which is replaced by an output multiplexor 490 at an NoC address interface 492 and an NoC data interface 472 at an output of the write interface 470.

Some aspects of the first transaction buffer bank 430 and the second transaction buffer bank 440 operate in ping-pong mode. For example, while the first transaction buffer bank 430 is filled with incoming pixels, the second transaction buffer bank 440 is drained out to the write interface 470. Similarly, while the second transaction buffer bank 440 is drained out to the write interface 470, the first transaction buffer bank 430 is filled with incoming pixels. Each of the line buffers 420 can hold 4096 pixels (e.g., full image line width) before filling the first transaction buffer bank 430 and/or the second transaction buffer bank 440. For a stride-2 mode, two lines each for the RGB channels (e.g., total six lines) of the R pixels 342, the G pixels 344, and the B pixels 346 are stored in the line buffers 420.

For a spatial major stride-2 mode, the first two lines are stored in the line buffers 420. During the next two lines, the incoming pixels (e.g., the R pixels 342, the G pixels 344, and the B pixels 346) and pixels from the line buffers 420 are stored in the transaction buffers (e.g., 432, 434, 436, 438, 442, 444, 446, and 448). This sequence of operations is repeated after every four lines. In these aspects of the present disclosure, the ML storage acceleration format block 400 converts the first layer of neural network data to an ML storage acceleration format, for example, as illustrated in FIGS. 5A and 5B.

FIGS. 5A and 5B are block diagrams illustrating a partition of an image into a machine learning (ML) storage acceleration format, according to aspects of the present disclosure. As shown in FIG. 5A, an image 500, having an image height 510 and an image width 520, is split into stripes 550 (550-0, 550-1, 550-2, . . . , 550-17). In this example, the image 500 is split into stripes having a fixed size, which varies according to a memory access stride size (e.g., a stride-1 case and a stride-2 case). For example, a stripe size of 64×8 is used for a stride-1 case, and a stripe size of 128×16 is used for a stride-2 case. In this example, the stripe order is in a raster scan format (e.g., left to right and top to bottom).

FIG. 5B shows one of the stripes 550, having a stripe height 552 and a stripe width 570, is split into blocks 560 (560-0, 560-1, 560-2, . . . , 560-7). In this example, the stripe height 552 has a stripe size of 64×8 for a stride-1 case, such that the stripe height 552 is eight pixels and the stripe width 570 is 64 pixels. The block order is from left to right. In these aspects of the present disclosure, the stripes 550 are split into the blocks 560 having a block size of 8×8 for a stride-1 case. Alternatively, the block size is 16×16 for the stride-2 case. Based on the block size of 8×8 for the stride-1 case, the stripes 550 have eight blocks (e.g., $Block_0$ 560-0, $Block_1$ 560-1, $Block_2$ 560-2, . . . , $Block_7$ 560-7).

In practice, machine learning hardware accelerators (e.g., MLA 132) and the neural signal processor (NSP) may be configured to operate according to a blocked memory storage format. As shown in FIG. 5B, the blocks 560 may have a depth of four, corresponding to the first layer of many computer vision neural networks, which are generally limited to three channels (e.g., red, green, and blue (RGB)). This machine learning (ML) storage acceleration format reduces wasted space for processing the first layers of computer vision neural networks. In particular, this ML storage acceleration format can be processed directly by hardware accelerators and NSP without having to convert to a standard layout. In some aspects of the present disclosure, the ML storage acceleration format supports up to four input channels by packing, for example, eight spatial patches (e.g., 8×8) into one storage block (e.g., $Block_0$ 560-0, $Block_1$ 560-1, $Block_2$ 560-2, . . . , $Block_7$ 560-7). In these aspects of the present disclosure, video pre-processing units that prepare the stripes 550 for processing by vision-based neural networks provide output directly in the ML storage acceleration format, for example, as shown in FIGS. 6A-6C.

Figure 6A:
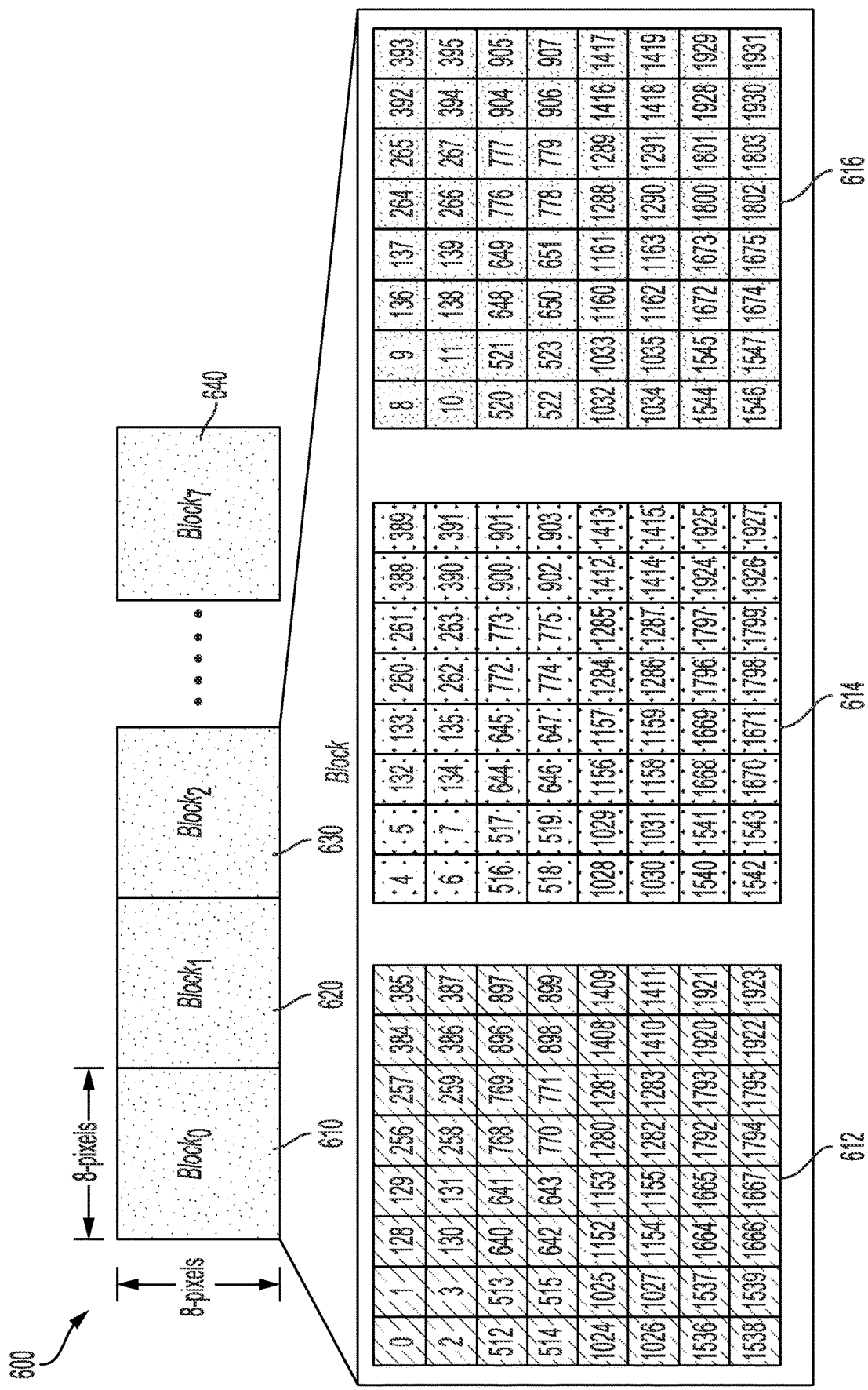
FIGS. 6A-6C illustrate various machine learning (ML) storage acceleration formats, according to aspects of the present disclosure.
Figure 6B:
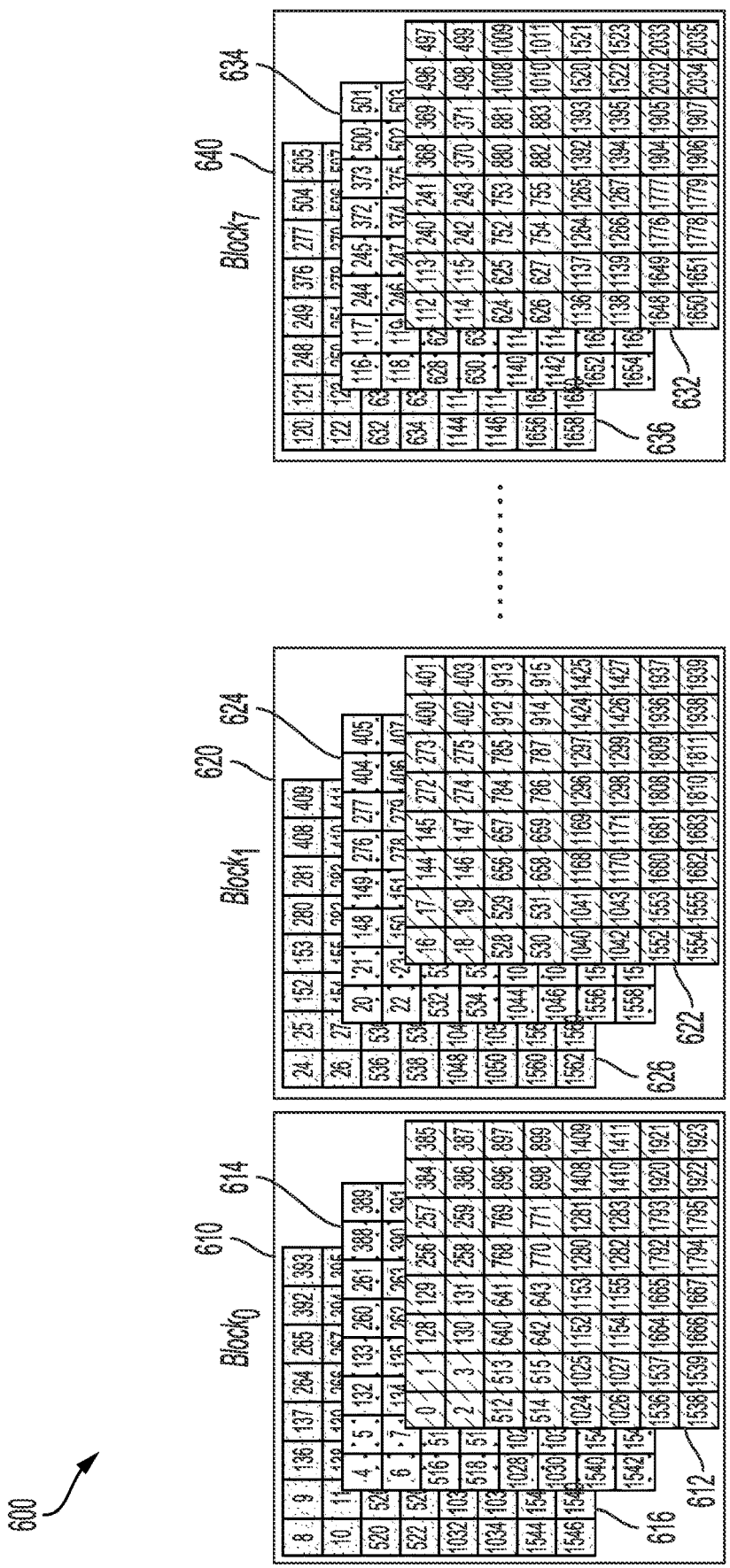
Figure 6C:
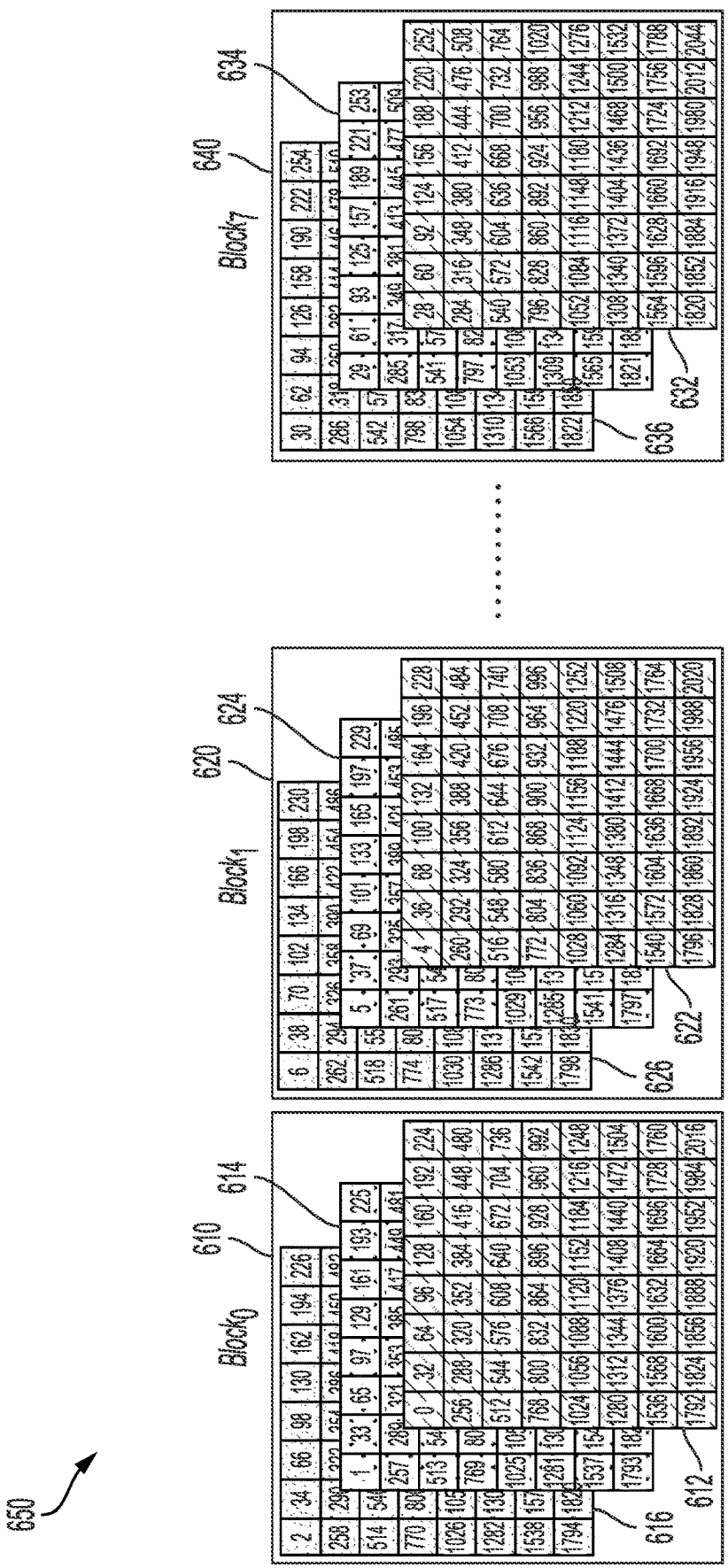

FIGS. 6A-6C illustrate various machine learning (ML) storage acceleration formats, according to aspects of the present disclosure. As shown in FIGS. 6A-6C, the ML storage acceleration format is described as supporting two ML storage acceleration formats, which may vary according to a memory stride and a desired precision, according to aspects of the present disclosure. For example, for an eight-bit integer (INT8) precision, each stripe represents the data for a spatial size of 64 (e.g., 8×8) and channel depth of 32 (=2K bytes), as shown in FIG. 5B. For a 16-bit floating point (FP16) precision, each stripe represents the data for a spatial size of 32 (e.g., 8×4) and a channel depth of 32 (=2K bytes). In these examples, each block contains pixels for each channel in the image (e.g., RGB channels). Based on the spatial/channel major storage acceleration format, the pixel addresses are laid out in a spatial or channel axis.

FIG. 6A is a block diagram illustrating a stripe 600 in a first storage acceleration format, in accordance with aspects of the present disclosure. FIG. 6A illustrates a spatial major storage acceleration formation, according to aspects of the present disclosure. In this example, a red channel 612, a green channel 614, and a blue channel 616 are shown for an initial block 610 ($Block_0$) of the stripe 600. In this example, the stripe 600 includes additional memory blocks (e.g., $Block_0$ 610, $Block_1$ 620, $Block_2$ 630, . . . , $Block_7$ 640). According to the spatial major storage acceleration format, the pixels of the initial block 610 are arranged in 2×2 spatial patches (e.g., for an eight-bit integer (INT8)), which are consecutive along the red channel 612, the green channel 614, and the blue channel 616 of the initial block 610. These 2×2 spatial patches then proceed by the 32 channels of the stripe 600, and then by remaining rows and columns, as shown in FIG. 6B.

FIG. 6B is a diagram further illustrating the stripe 600 in a spatial major storage acceleration format, in accordance with aspects of the present disclosure. In this example, a red channel 622, a green channel 624, and a blue channel 626 are shown for a next block 620 ($Block_1$) of the stripe 600. In addition, a red channel 632, a green channel 634, and a blue channel 636 are shown for a final block 640 ($Block_7$) of the stripe 600 of memory blocks (e.g., $Block_0$ 610, $Block_1$ 620, . . . , $Block_7$ 640). According to the spatial major storage acceleration format, the pixels of the next block 620 and the final block 640 continue arrangement of the pixels in the 2×2 spatial patches, which are consecutive along the red, green, and blue channels of the next block 620 and the final block 640. These 2×2 spatial patches then proceed by remaining rows and columns. In some aspects of the present disclosure, the pixels are laid out in the 2×2 spatial domain, and then in the channel domain for the remaining blocks. In this example, each two pixel row in the stripe 600 covers 512 bytes and may be written to memory with two consecutive write transactions.

FIG. 6C is a diagram of a second storage acceleration format, in accordance with aspects of the present disclosure. FIG. 6C illustrates a channel major storage acceleration format 650, according to aspects of the present disclosure. In this example, 32 channels of the memory blocks (e.g., $Block_0$ 610, $Block_1$ 620, . . . , $Block_7$ 640) for each "pixel" are consecutive in memory, then proceed by rows and then by columns. The spatial major and the channel major storage acceleration formats enable accelerated pixel processing by matrix units that are configured to process N (e.g., N≤32) input channels per cycle, in which N may be equal to four (N=4). In these examples, each of the memory blocks (e.g., $Block_0$ 610, $Block_1$ 620, . . . , $Block_7$ 640) contain pixels for each channel in the image (e.g., RGB channels). Based on the spatial/channel major storage acceleration format, the pixel addresses are laid out in a spatial or channel axis. In some aspects of the present disclosure, the pixels are laid out in a channel domain, and then in a spatial domain for the remaining memory blocks. In this example, each row in the stripe 600 covers 256 bytes and may be written to memory with one write transaction.

Figure 7:
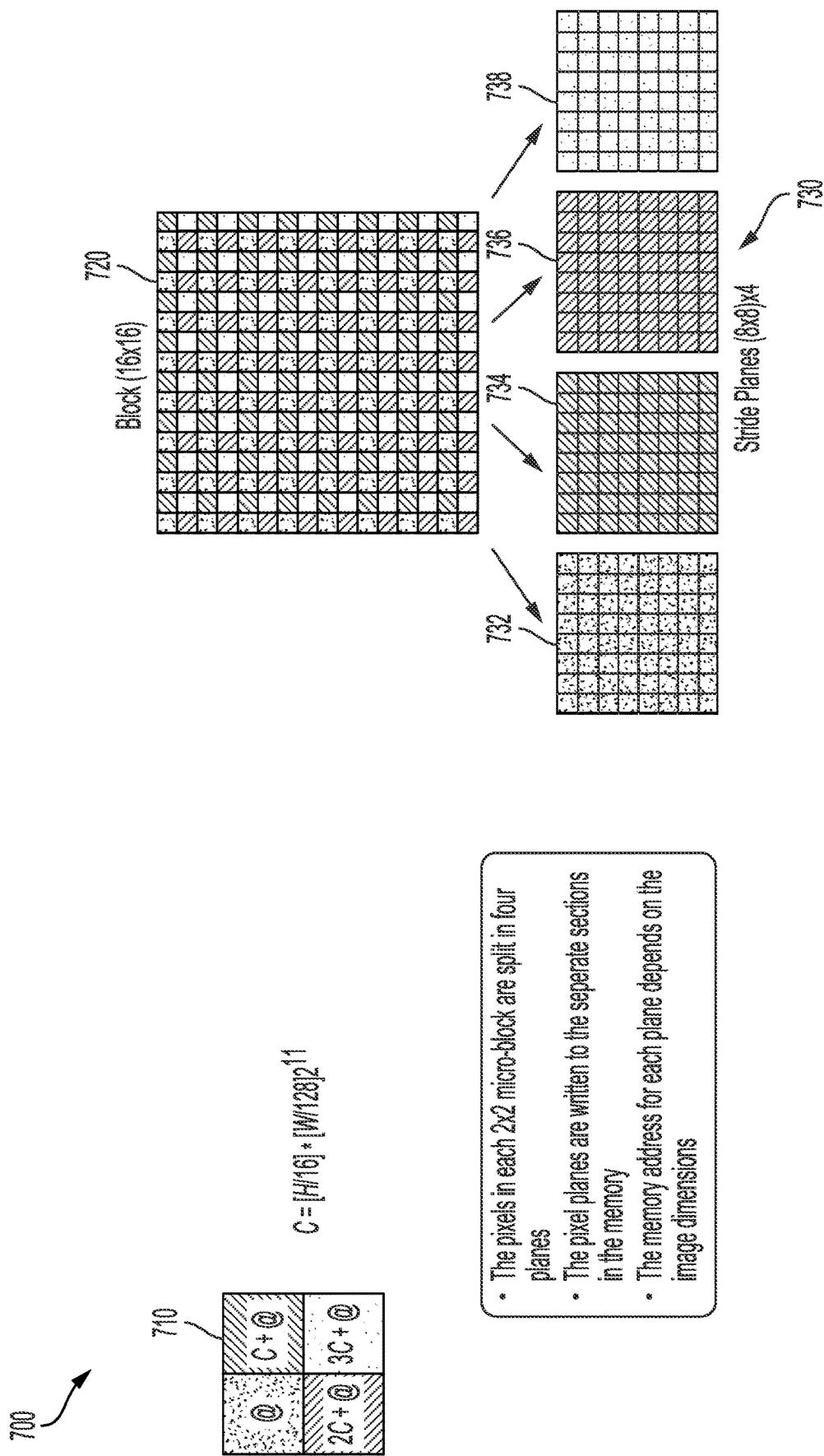
FIG. 7 is a block diagram illustrating a stride-2 machine learning (ML) acceleration format, in accordance with aspects of the present disclosure.

FIG. 7 is a block diagram illustrating a stride-2 machine learning (ML) acceleration format 700, in accordance with aspects of the present disclosure. In the stride-2 ML storage acceleration format 700, pixels in each 2×2 micro-block 710 of a block 720 (e.g., 16×16) are split into four pixel planes 730 (e.g., (8×8)×4). In this example, the four pixel planes 730 include a first pixel plane 732, a second pixel plane 734, a third pixel plane 736, and a fourth pixel plane 738. The pixel planes 730 are written to the separate sections in the memory. In this example, memory addresses of the 2×2 micro-block 710 (e.g., @, C+@, 2C+@, 3C+@) are determined according to a channel (C) number (e.g., C=[H/16]*[W/128]$2^{11}$), a height (H), and a width (W) of the strides shown in FIGS. 6A-6C. In some aspects of the present disclosure, the memory address for each of the pixel planes 730 depends on the image dimensions, and may be computed as shown in FIG. 8.

FIG. 8 illustrates a table including equations for data packing formats to support the machine learning (ML) storage acceleration formats, in accordance with aspects of the present disclosure. In this example, a table 800 provides equations for computing data packing formats for the spatial major ML acceleration formats and the channel major storage acceleration formats shown in FIGS. 6A-6C. The equations are provided for eight-bit integer (INT8) precision and 16-bit floating point (FP16) precision for stride-1 and stride-2. It should be noted that the channel major ML storage acceleration format may not be supported for stride-2 with FP16 precision. The equations provided in the table 800 for computing data packing formats may provide memory address sequencing, for example, as shown in FIGS. 9A and 9B.

Figure 9A:
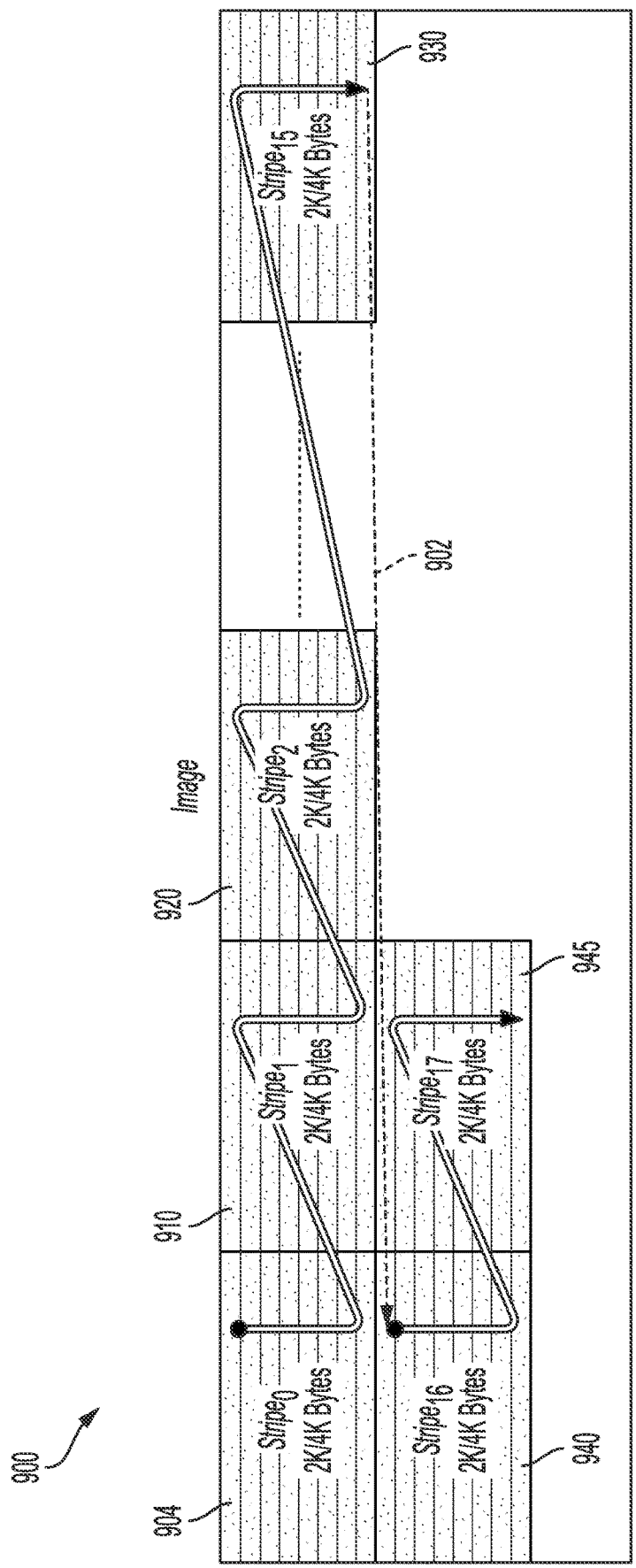
FIGS. 9A and 9B are diagrams illustrating machine learning (ML) storage acceleration format memory addressing sequences, according to aspects of the present disclosure.
Figure 9B:
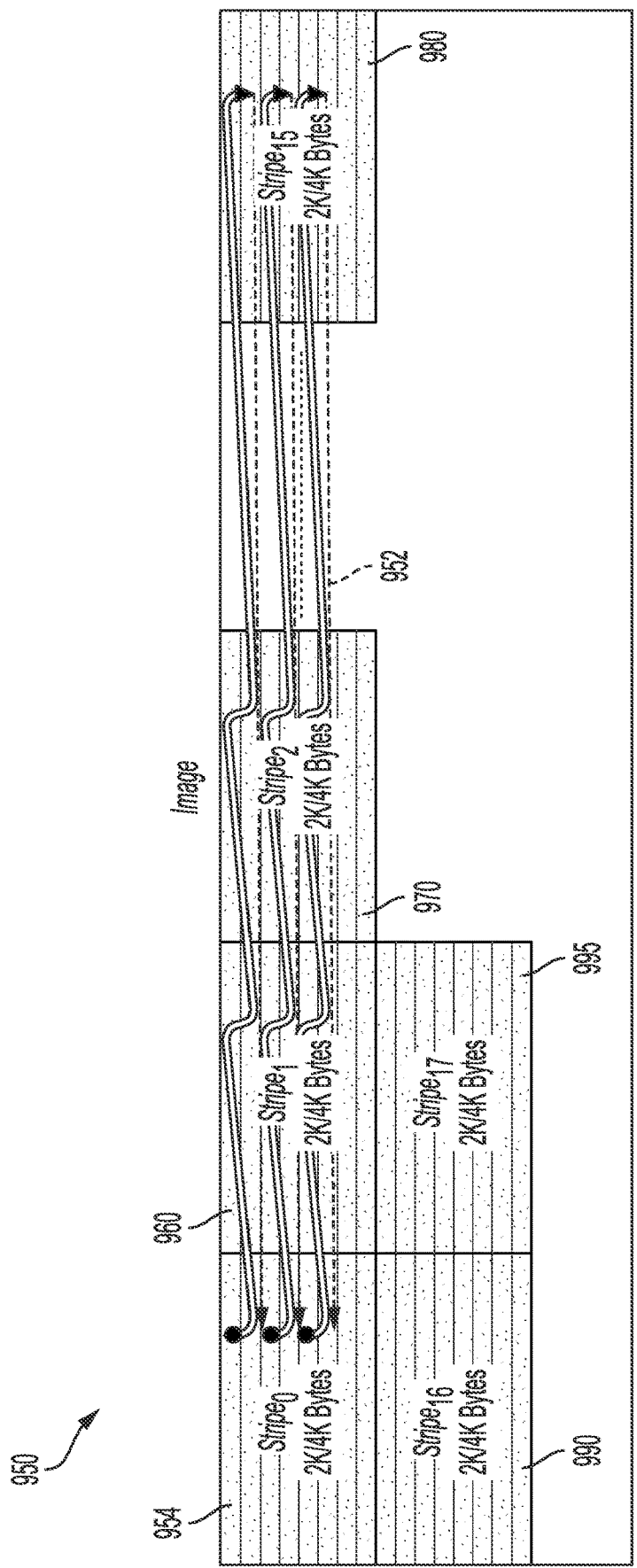

FIGS. 9A and 9B are diagrams illustrating machine learning (ML) storage acceleration format memory addressing sequences, according to aspects of the present disclosure.

FIG. 9A illustrates writing of an image 900 in an ML storage acceleration format, according to aspects of the present disclosure. In this example, data packing according to the ML storage acceleration format writes the image data of the image 900 in stripes (e.g., 904, 910, 920, 930, 940, 945) in a raster scan order 902 (e.g., left to right and top to bottom). In addition, the data packing within each of the stripes (e.g., 904, 910, 920, 930, 940, 945) is in a top to bottom order. This process may be performed by the write interface 470 of the ML storage acceleration format block 400 of FIG. 4. In some aspects of the present disclosure, the write interface 470 supports both planar and channel interleaved formats.

FIG. 9B illustrates writing of an image 950 in a machine learning (ML) storage acceleration format, according to aspects of the present disclosure. In this example, data packing according to the ML storage acceleration format writes the image data of the image 950 in stripes (e.g., 954, 960, 970, 980, 990, 995), in which the number of the stripes is directly proportional to a width of the image 950. In some aspects of the present disclosure, the ML storage acceleration format generates write transactions for two rows in a stripe (e.g., 954, 960, 970, 980, 990, 995) and then proceeds to the next stripe (e.g., 954, 960, 970, 980, 990, 995), according to a pattern 952. This process may also be performed by the write interface 470 of the ML storage acceleration format block 400 of FIG. 4. In some aspects of the present disclosure, the number of memory pages that are simultaneously opened is directly proportional to the width of the image 950 and the ML storage acceleration format.

Figure 10:
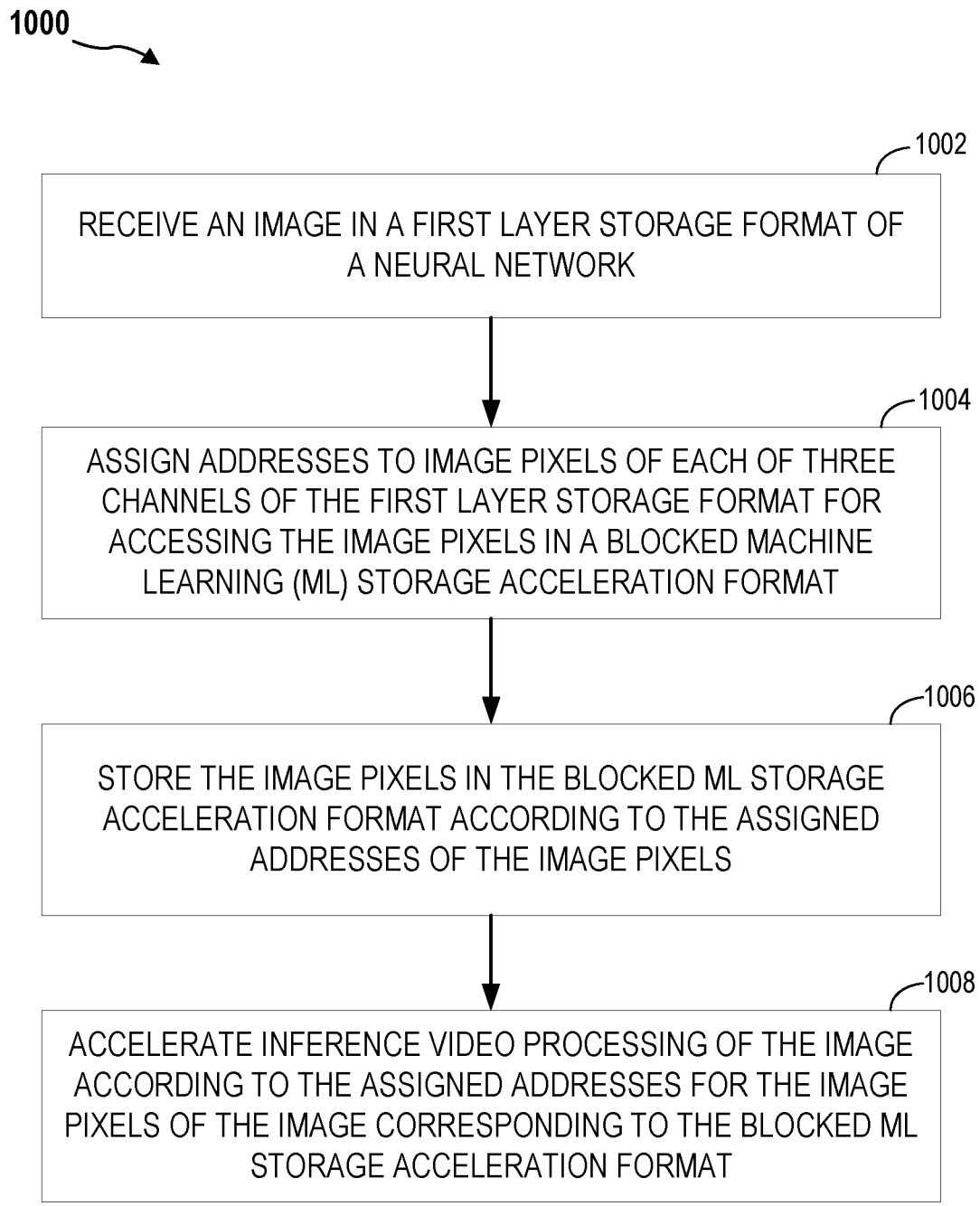
FIG. 10 is a flow diagram illustrating a method for a memory storage format to accelerate machine learning (ML) on a computing device, according to aspects of the present disclosure.

FIG. 10 is a flow diagram illustrating a method for a memory storage format to accelerate machine learning (ML) on a computing device, according to aspects of the present disclosure. A method 1000 begins at block 1002, in which an image is received in a first layer storage format of a neural network. In practice, a first layer of many computer vision machine learning (ML) networks is limited to three channels (e.g., red, green, and blue (RGB)). For example, a tensor may represent the first layer of a computer vision ML network according to a standard NCHW (e.g., batch_size (N), channel (C), height (H), weight (W)) format or an NHWC (e.g., batch_size (N), height (H), weight (W), channel (C)) format, which is fully packed and does not waste any space. By contrast, layers of a computer vision ML network beyond the first layer usually have a greater number of channels (e.g., 32 or more channels).

At block 1004, addresses are assigned to image pixels of each of three channels of the first layer storage format for accessing the image pixels in a blocked ML storage acceleration format. For example, as shown in FIG. 5A, the image 500 is split into stripes 550 (550-0, 550-1, 550-2, . . . , 550-17) having a fixed size, which varies according to a memory access stride size (e.g., a stride-1 case and a stride-2 case "variable stride size"). In FIG. 5B, the stripes 550 are split into blocks 560 (560-0, 560-1, 560-2, . . . , 560-7), in which the stripe height 552 has a size of 64×8 for a stride-1 case, such that the stripe height 552 is eight pixels and the stripe width 570 is 64 pixels. As shown in FIG. 6A-6C, each block of the stripe 600 contains pixels for each channel in the image (e.g., RGB channels). Based on the spatial/channel major storage acceleration format, the pixel addresses are laid out in a spatial or channel axis. As shown in FIG. 4, a transaction (Txn) address generator 480 generates the address for the write transaction, which is replaced by an output multiplexor 490 at an NoC address interface 492 and an NoC data interface 472 at an output of a write interface 470.

At block 1006, the image pixels are stored in the blocked ML storage acceleration format according to the assigned addresses of the image pixels. For example, as shown in FIG. 9A, data packing according to the ML storage acceleration format writes the image data of the image 900 in stripes (e.g., 904, 910, 920, 930, 940, 945) in a raster scan order 902 (e.g., left to right and top to bottom). In addition, the data packing within each of the stripes (e.g., 904, 910, 920, 930, 940, 945) is in a top to bottom order. As shown in FIG. 9B, the ML storage acceleration format generates write transactions for two rows in a stripe (e.g., 954, 960, 970, 980, 990, 995) and then proceeds to the next stripe (e.g., 954, 960, 970, 980, 990, 995), according to a pattern 952.

At block 1008, accelerated inference video processing of the image is performed according to the assigned addresses for the image pixels of the image corresponding to the blocked ML storage acceleration format. For example, as shown in FIG. 1, the NPU 130 includes machine learning accelerators (MLA) 132. As shown in FIGS. 3 and 4, the ML storage acceleration format block 400 includes a pixel input interface 410 to receive, for example, the R pixels 342, the G pixels 344, and the B pixels 346 from the transformation/multi-dimensional scaling/cropping logic 340 of the FIG. 3 inference VPP engine 300. In some aspects of the present disclosure, the ML storage acceleration format block 400 is configured to output data in a machine learning (ML) storage acceleration format to enabled accelerated inference video processing.

The method 1000 may include splitting the image into stripes according to an image width and an image height. The method 1000 may also include splitting each of the stripes into memory blocks having a memory block size according to a stride size. The method 1000 may further include computing the assigned addresses to layout the image pixels within the memory blocks, in which each of the memory blocks is assigned the image pixels for each channel in the image. The method 1000 may also include arranging image pixels in the memory blocks according to a spatial axis or a channel axis of the memory blocks.

The method 1000 may also include storing the image pixels in the memory blocks in a spatial domain; and then storing the image pixels in a channel domain. The method 1000 may further include storing an initial group of the image pixels in an initial memory block of the memory blocks in a first channel of the initial memory block. The method 1000 may also include storing a next group of the image pixels in the initial memory block of the memory blocks in a second channel of the initial memory block. The method 1000 may further include storing a subsequent group of the image pixels in the initial memory block of the memory blocks in a third channel of the initial memory block. The method 1000 may also include repeating storing for each of the memory blocks and for each consecutive group of the image pixels, for example, as shown in FIG. 6B.

The method 1000 may include storing the image pixels in the memory blocks in a channel domain of the memory blocks; and then storing the image pixels in a spatial domain of the memory blocks. For example, the method 1000 may include storing an initial image pixel in an initial memory block of the memory blocks in a first channel of the initial memory block. The method 1000 may also include storing a next image pixel in the initial memory block of the memory blocks for a second channel of the initial memory block. The method 1000 may further include storing a subsequent image pixel in the initial memory block of the memory blocks in a third channel of the initial memory block. The method 1000 may also include repeating the storing of the selected image pixel, the next image pixel, and the subsequent image pixel for each memory block of the memory blocks and for each consecutive selected, next, and subsequent ones of the image pixels, for example, as shown in FIG. 6C.

In some aspects, the method 1000 may be performed by the SoC 100 (FIG. 1). That is, each of the elements of the method 1000, may, for example, but without limitation, be performed by the SoC 100 or one or more processors (e.g., CPU 102 and/or NPU 130) and/or other components included therein.

Implementation examples are described in the following numbered clauses:

1. A processor-implemented method for a memory storage format to accelerate machine learning (ML) on a computing device, comprising:

receiving an image in a first layer storage format of a neural network;

assigning addresses to image pixels of each of three channels of the first layer storage format for accessing the image pixels in a blocked ML storage acceleration format;

storing the image pixels in the blocked ML storage acceleration format according to the assigned addresses of the image pixels; and accelerating inference video processing of the image according to the assigned addresses for the image pixels of the image corresponding to the blocked ML storage acceleration format.

2. The method of clause 1, in which the assigning of addresses comprises: splitting the image into a plurality of stripes according to an image width and an image height;

splitting each of the stripes into memory blocks having a memory block size according to a stride size; and computing the assigned addresses to layout the image pixels within the memory blocks, in which each of the image pixels for each channel in the image are assigned to the memory blocks.

3. The method of any of clauses 1 or 2, in which storing the image comprises arranging image pixels in memory blocks according to a spatial axis or a channel axis of the memory blocks.

4. The method of clause 3, further comprising:

storing the image pixels in the memory blocks in a spatial domain; and then storing the image pixels in a channel domain.

5. The method of clause 4, further comprising:

storing an initial group of the image pixels in an initial memory block of the memory blocks in a first channel of the initial memory block;

storing a next group of the image pixels in the initial memory block of the memory blocks in a second channel of the initial memory block;

storing a subsequent group of the image pixels in the initial memory block of the memory blocks in a third channel of the initial memory block; and repeating storing for each memory block of the memory blocks and for each consecutive group of the image pixels.

6. The method of clause 3, further comprising:

storing the image pixels in the memory blocks in a channel domain of the memory blocks; and then storing the image pixels in a spatial domain of the memory blocks.

7. The method of clause 6, further comprising:
storing a selected image pixel in an initial memory block of the memory blocks in a first channel of the initial memory block;
storing a next image pixel in the initial memory block of the memory blocks for a second channel of the initial memory block;
storing a subsequent image pixel in the initial memory block of the memory blocks in a third channel of the initial memory block; and
repeating the storing of the selected image pixel, the storing of the next image pixel, and the storing of the subsequent image pixel for each memory block of the memory blocks and for each consecutive selected, next, and subsequent ones of the image pixels.

8. The method of any of clauses 1-7, in which accelerating inference video processing comprises simultaneously processing each of the three channels of the first layer storage format in the blocked ML storage acceleration format through matrix units of a neural signal processor (NSP) of the computing device.

9. The method of any of clauses 1-8, in which a precision of the first layer storage format of the neural network comprises 16-bit floating point (FP16) or quantized eight-bit integer (INT8).

10. A non-transitory computer-readable medium having program code recorded thereon for a memory storage format to accelerate machine learning (ML) on a computing device, the program code being executed by a processor and comprising:
program code to receive an image in a first layer storage format of a neural network;
program code to assign addresses to image pixels of each of three channels of the first layer storage format for accessing the image pixels in a blocked ML storage acceleration format;
program code to store the image pixels in the blocked ML storage acceleration format according to the assigned addresses of the image pixels; and
program code to accelerate inference video processing of the image according to the assigned addresses for the image pixels of the image corresponding to the blocked ML storage acceleration format.

11. The non-transitory computer-readable medium of clause 10, in which the program code to assign of addresses comprises:
program code to split the image into a plurality of stripes according to an image width and an image height;
program code to split each of the stripes into memory blocks having a memory block size according to a stride size; and
program code to compute the assigned addresses to layout the image pixels within the memory blocks, in which each of the image pixels for each channel in the image are assigned to the memory blocks.

12. The non-transitory computer-readable medium of any of clauses 9 or 10, in which program code to store the image comprises program code to arrange image pixels in memory blocks according to a spatial axis or a channel axis of the memory blocks.

13. The non-transitory computer-readable medium of clause 12, further comprising:
program code to store the image pixels in the memory blocks in a spatial domain; and then
program code to store the image pixels in a channel domain.

14. The non-transitory computer-readable medium of clause 13, further comprising:
program code to store an initial group of the image pixels in an initial memory block of the memory blocks in a first channel of the initial memory block;
program code to store a next group of the image pixels in the initial memory block of the memory blocks in a second channel of the initial memory block;
program code to store a subsequent group of the image pixels in the initial memory block of the memory blocks in a third channel of the initial memory block; and
program code to repeat program code to store for each memory block of the memory blocks and for each consecutive group of the image pixels.

15. The non-transitory computer-readable medium of clause 12, further comprising:
program code to store the image pixels in the memory blocks in a channel domain of the memory blocks; and then
program code to store the image pixels in a spatial domain of the memory blocks.

16. The non-transitory computer-readable medium of clause 15, further comprising:
program code to store a selected image pixel in an initial memory block of the memory blocks in a first channel of the initial memory block;
program code to store a next image pixel in the initial memory block of the memory blocks for a second channel of the initial memory block;
program code to store a subsequent image pixel in the initial memory block of the memory blocks in a third channel of the initial memory block; and
program code to repeat the program code to store of the selected image pixel, the program code to store of the next image pixel, and the program code to store of the subsequent image pixel for each memory block of the memory blocks and for each consecutive selected, next, and subsequent ones of the image pixels.

17. The non-transitory computer-readable medium of any of clause 10-16, in which the program code to accelerate inference video processing comprises program code to simultaneously process each of the three channels of the first layer storage format in the blocked ML storage acceleration format through matrix units of a neural signal processor (NSP) of the computing device.

18. The non-transitory computer-readable medium of any of clauses 10-17, in which a precision of the first layer storage format of the neural network comprises 16-bit floating point (FP16) or quantized eight-bit integer (INT8).

19. A system for a machine learning (ML) acceleration architecture, the system comprising:
a neural signal processor (NSP) to assign addresses to image pixels of each of three channels of a first layer storage format of a neural network for accessing the image pixels in a blocked ML storage acceleration format, and to store the image pixels in the blocked ML storage acceleration format according to the assigned addresses of the image pixels; and
an ML accelerator to accelerate inference video processing of an image according to the assigned addresses for the image pixels of the image corresponding to the blocked ML storage acceleration format.

20. The system of clause 19, in which the NSP is further to store the image pixels in the memory blocks in a spatial domain, and then to store the image pixels in a channel domain.
21. The system of clause 19, in which the NSP is further to store the image pixels in the memory blocks in a channel domain of the memory blocks, and then to store the image pixels in a spatial domain of the memory blocks.
22. The system of any of clauses 19-21, in which the NSP comprises: matrix units to simultaneously process each of the three channels of the first layer storage format in the blocked ML storage acceleration format to accelerate inference video processing of the image by the ML accelerator.
23. The system of any of clauses 19-22, in which a precision of the first layer storage format of the neural network comprises 16-bit floating point (FP16) or quantized eight-bit integer (INT8).

The system for accelerating machine learning includes means for storing the image in the blocked ML storage acceleration format according to the assigned address. In one aspect, the storing means may be the storage acceleration format block 400 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed, include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read-only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein, may be downloaded and/or otherwise obtained by a user terminal and/or base station as applicable. For example, such a device can be coupled to a server to facilitate the transfer of means for performing the methods described herein. Alternatively, various methods described herein, may be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method for a memory storage format to accelerate machine learning (ML) on a computing device, comprising:
receiving an image in a first layer storage format of a neural network;
assigning addresses to image pixels of each of three channels of the first layer storage format for accessing the image pixels in a blocked ML storage acceleration format;
splitting the image into a plurality of stripes according to an image width and an image height, in which a stripe height of each of the stripes is less than the image height;

splitting each of the stripes into memory blocks having a memory block size according to a variable stride size to form the blocked ML storage acceleration format;

storing the image pixels in the blocked ML storage acceleration format according to the assigned addresses of the image pixels; and accelerating inference video processing of the image according to the assigned addresses for the image pixels of the image corresponding to the blocked ML storage acceleration format.

2. The method of claim 1, in which the assigning of addresses comprises:

computing the assigned addresses to layout the image pixels within the memory blocks, in which each of the image pixels for each channel in the image are assigned to the memory blocks.

3. The method of claim 1, in which storing the image comprises arranging image pixels in the memory blocks according to a spatial axis or a channel axis of the memory blocks.

4. The method of claim 3, further comprising:

storing the image pixels in the memory blocks in a spatial domain; and then storing the image pixels in a channel domain.

5. The method of claim 4, further comprising:

storing an initial group of the image pixels in an initial memory block of the memory blocks in a first channel of the initial memory block;

storing a next group of the image pixels in the initial memory block of the memory blocks in a second channel of the initial memory block;

storing a subsequent group of the image pixels in the initial memory block of the memory blocks in a third channel of the initial memory block; and repeating storing for each memory block of the memory blocks and for each consecutive group of the image pixels.

6. The method of claim 3, further comprising:

storing the image pixels in the memory blocks in a channel domain of the memory blocks; and then storing the image pixels in a spatial domain of the memory blocks.

7. The method of claim 6, further comprising:

storing a selected image pixel in an initial memory block of the memory blocks in a first channel of the initial memory block;

storing a next image pixel in the initial memory block of the memory blocks for a second channel of the initial memory block;

storing a subsequent image pixel in the initial memory block of the memory blocks in a third channel of the initial memory block; and repeating the storing of the selected image pixel, the storing of the next image pixel, and the storing of the subsequent image pixel for each memory block of the memory blocks and for each consecutive selected, next, and subsequent ones of the image pixels.

8. The method of claim 1, in which accelerating inference video processing comprises simultaneously processing each of the three channels of the first layer storage format in the blocked ML storage acceleration format through matrix units of a neural signal processor (NSP) of the computing device.

9. The method of claim 1, in which a precision of the first layer storage format of the neural network comprises 16-bit floating point (FP16) or quantized eight-bit integer (INT8).

10. A non-transitory computer-readable medium having program code recorded thereon for a memory storage format to accelerate machine learning (ML) on a computing device, the program code being executed by a processor and comprising:

program code to receive an image in a first layer storage format of a neural network;

program code to assign addresses to image pixels of each of three channels of the first layer storage format for accessing the image pixels in a blocked ML storage acceleration format;

program code to split the image into a plurality of stripes according to an image width and an image height, in which a stripe height of each of the stripes is less than the image height;

program code to split each of the stripes into memory blocks having a memory block size according to a variable stride size to form the blocked ML storage acceleration format;

program code to store the image pixels in the blocked ML storage acceleration format according to the assigned addresses of the image pixels; and program code to accelerate inference video processing of the image according to the assigned addresses for the image pixels of the image corresponding to the blocked ML storage acceleration format.

11. The non-transitory computer-readable medium of claim 10, in which the program code to assign addresses comprises:

program code to compute the assigned addresses to layout the image pixels within the memory blocks, in which each of the image pixels for each channel in the image are assigned to the memory blocks.

12. The non-transitory computer-readable medium of claim 10, in which the program code to store the image pixels comprises program code to arrange the image pixels in the memory blocks according to a spatial axis or a channel axis of the memory blocks.

13. The non-transitory computer-readable medium of claim 12, further comprising:

program code to store the image pixels in the memory blocks in a spatial domain; and then program code to store the image pixels in a channel domain.

14. The non-transitory computer-readable medium of claim 13, further comprising:

program code to store an initial group of the image pixels in an initial memory block of the memory blocks in a first channel of the initial memory block;

program code to store a next group of the image pixels in the initial memory block of the memory blocks in a second channel of the initial memory block;

program code to store a subsequent group of the image pixels in the initial memory block of the memory blocks in a third channel of the initial memory block; and program code to repeat program code to store for each memory block of the memory blocks and for each consecutive group of the image pixels.

15. The non-transitory computer-readable medium of claim 12, further comprising:

program code to store the image pixels in the memory blocks in a channel domain of the memory blocks; and then program code to store the image pixels in a spatial domain of the memory blocks.

16. The non-transitory computer-readable medium of claim 15, further comprising:
- program code to store a selected image pixel in an initial memory block of the memory blocks in a first channel of the initial memory block;
- program code to store a next image pixel in the initial memory block of the memory blocks for a second channel of the initial memory block;
- program code to store a subsequent image pixel in the initial memory block of the memory blocks in a third channel of the initial memory block; and
- program code to repeat the program code to store the selected image pixel, the program code to store the next image pixel, and the program code to store the subsequent image pixel for each memory block of the memory blocks and for each consecutive selected, next, and subsequent ones of the image pixels.

17. The non-transitory computer-readable medium of claim 10, in which the program code to accelerate inference video processing comprises program code to simultaneously process each of the three channels of the first layer storage format in the blocked ML storage acceleration format through matrix units of a neural signal processor (NSP) of the computing device.

18. The non-transitory computer-readable medium of claim 10, in which a precision of the first layer storage format of the neural network comprises 16-bit floating point (FP16) or quantized eight-bit integer (INT8).

19. A system for a machine learning (ML) acceleration architecture, the system comprising:
- a neural signal processor (NSP) to assign addresses to image pixels of each of three channels of a first layer storage format of a neural network for accessing the image pixels in a blocked ML storage acceleration format, to split an image into a plurality of stripes according to an image width and an image height, in which a stripe height of each of the stripes is less than the image height, to split each of the stripes into memory blocks having a memory block size according to a variable stride size to form the blocked ML storage acceleration format, and to store the image pixels in the blocked ML storage acceleration format according to the assigned addresses of the image pixels; and
- an ML accelerator to accelerate inference video processing of an image according to the assigned addresses for the image pixels of the image corresponding to the blocked ML storage acceleration format.

20. The system of claim 19, in which the NSP is further to store the image pixels in the memory blocks in a spatial domain, and then to store the image pixels in a channel domain.

21. The system of claim 19, in which the NSP is further to store the image pixels in the memory blocks in a channel domain of the memory blocks, and then to store the image pixels in a spatial domain of the memory blocks.

22. The system of claim 19, in which the NSP comprises:
- matrix units to simultaneously process each of the three channels of the first layer storage format in the blocked ML storage acceleration format to accelerate inference video processing of the image by the ML accelerator.

23. The system of claim 19, in which a precision of the first layer storage format of the neural network comprises 16-bit floating point (FP16) or quantized eight-bit integer (INT8).

* * * * *